United States Patent [19]

Moreno et al.

[11] 3,791,283

[45] Feb. 12, 1974

[54] METHOD FOR PRODUCING HEAT AND ACID STABLE WHEY PROTEIN MATERIAL

[75] Inventors: Victor Moreno, White Plains; David A. Lysak, Pearl River, both of N.Y.

[73] Assignee: General Foods Corporation, White Plains, N.Y.

[22] Filed: Aug. 28, 1970

[21] Appl. No.: 68,026

[52] U.S. Cl. .................................................... 99/57
[51] Int. Cl. ............................................. A23c 21/00
[58] Field of Search ............ 99/57, 54; 210/22, 321

[56] References Cited
UNITED STATES PATENTS

| | | | |
|---|---|---|---|
| 3,560,219 | 2/1971 | Atteberg | 99/57 |
| 3,447,930 | 6/1969 | Francis | 99/57 |
| 3,235,386 | 2/1966 | Mykleby | 99/57 |

OTHER PUBLICATIONS

"Membrane Separation Process For the Abatement of Pollution From Cottage Cheese Whey" Horton et al.; Mar. 11, 1970, Cottage Cheese & Milk Products Symposium Univ. of Maryland.

*Primary Examiner*—Arthur D. Kellogg
*Assistant Examiner*—Frederick Frei
*Attorney, Agent, or Firm*—Thomas R. Savoie; Daniel J. Donovan; Bruno P. Struzzi

[57] ABSTRACT

Heat and acid stable whey protein material is produced having on a weight basis ratios of calcium to protein from .002 to .05, ash to protein from .02 to 0.2 and calcium to ash from .02 to .35. This protein material is derived from liquid whey by means of adjusting the calcium content of liquid whey and then isolating the protein material by means of physical separation techniques.

8 Claims, No Drawings

METHOD FOR PRODUCING HEAT AND ACID STABLE WHEY PROTEIN MATERIAL

BACKGROUND OF THE INVENTION

This invention relates to the production of a whey protein fraction which is both heat and acid stable and which may be added to acid beverages and powdered acid beverage mixes in order to give them many of the nutritional values of whole milk. More particularly this invention concerns high protein beverages and beverage mixes which have a pH of about 4.0 and below and which may be carbonated and/or flavored so as to taste like regular acid beverages (e.g. soft drinks, fruit juices, etc.). The beverages of this invention are ideally suited for consumption by persons, especially children, who dislike the taste of whole milk but who desire or need a protein containing beverage.

Previous attempts to produce acidic protein beverages have not met with great commercial success since the proteins have tended to precipitate at a pH level of about 4 especially under the influence of heat. Acid stability of these proteins is important since the usual degree of acidity of conventional acid beverages is about pH 4 and below. Heat stability of the proteins is an important criteria when it is desired to produce a fully prepared acid beverage in accordance with this invention since it will usually be necessary to subject the liquid beverage to a heat treatment such as pasteurization or sterilization in order to make them shelf-stable.

The present invention has identified a protein fraction which is both heat stable and acid stable at about pH 4.0 and below and which can be added to acid beverages to yield pleasant-tasting protein beverages free of any protein precipitate. The present invention has also developed a method for isolating the desired protein fraction from whey.

Whey is the product remaining after the removal of fat and casein from milk in the process of cheesemaking. It contains about half of the milk solids including most of the lactose, about one-fifth of the protein, and most of the vitamins and minerals. A representative analysis of a liquid cheese whey contains about 93 percent water, about 5 percent lactose, about ½ percent dissolved minerals (ash), less than ½ percent fat and about 1 percent protein. The mineral content includes primarily soluble salts of calcium, sodium, potassium and phosphorous. Most cheese whey also contains the vitamins normally present in whole milk especially riboflavin and other vitamin B materials.

Some large cheese factories condense or dry whey for use in animal feeds and whey is also processed as a food ingredient for use in such products as bread, sherbet, and infant formulas. However, millions of gallons of whey annually go to waste in the United States and, therefore, whey constitutes a readily available and economical source of protein.

It has been found that protein fractions of whey can achieve a high degree of heat stability in solutions up to about 7% protein at pH levels of about 4.0 and below, and that these fractions may be incorporated into a soft drink-type beverage.

The proteins of whey derived from cow's milk have been described by Larson and Rolleri in the *Journal of Dairy Science*, 38:351 (1955) as being comprised of three main fractions with a representative analysis as follows:

|  |  | Weight % |
|---|---|---|
| Immune Globulins |  | 13.0 |
| Lactalbumins: |  | 68.1 |
| alpha-Lactalbumin | 19.7 |  |
| beta-Lactoglobulin | 43.7 |  |
| Serum Albumin | 4.7 |  |
| Proteose-peptone |  | 18.9 |

The immune globulins are classified as the "classical" globulin fraction and the lactalbumins are classified as the "classical" albumin fractions.

SUMMARY OF THE INVENTION

The commercial processes currently employed for the extraction of proteins from liquid whey include heating, concentrating and/or drying steps at the early stages of the process. Heat lability of whey proteins as well as their sensitivity to the calcium content of liquid whey or whey concentrates may cause these processes to produce protein materials which fail to remain in solution at about pH 4.0, especially after such heat treatments as pasteurization or sterilization. Many of these proteins will also precipitate under the influence of heat from solutions having a pH substantially below 4.0.

According to one embodiment of the present invention a heat and acid stable protein material is obtained from liquid whey by first reducing the calcium to protein weight ratio in the liquid whey by about 10 to 50 percent and then isolating a high protein material from the resulting liquid by means of physical separation. The processing conditions are controlled in order to produce a high protein material containing on a weight ratio basis calcium to protein of from .002 to .05, ash to protein of from .02 to 0.2 and calcium to ash of from .02 to 0.35.

It is an object of this invention to produce high-protein acid beverages which have the appeal of conventional soft drinks and fruit juices.

More specifically, it is an object of this invention to produce a shelf-stable beverage which contains at least about 3 percent protein and has a pH level of about 4.0 and below.

It is an additional object of this invention to produce a powdered beverage mix which will dissolve in water to yield a high-protein beverage with a pH of about 4.0 and below.

It is another object of this invention to produce a protein fraction of whey which is heat stable at pH 4.0 and below.

These and other objects will become apparent from the description herein.

DESCRIPTION OF THE INVENTION

According to the process of this invention a whey protein fraction soluble and heat stable at about pH 4.0 and below can be prepared.

The whey material employed in the process of this invention may be any liquid whey such as sweet whey (e.g. cheddar cheese whey about pH 4.7 – 6.0) or acid whey (e.g. cottage cheese whey about pH 3.9 – 4.2).

As was pointed out above, whey proteins are sensitive to the calcium concentration of the liquid whey material, the degree of sensitivity varying among the different types of protein present in the whey. As the liquid whey is heated and concentrated, calcium concentration increases and is thought to bring about the formation of large protein aggregates. These aggregates appear to possess, in addition to a higher molecular weight, a lower water of hydration and a lower charge density. As a consequence, when these protein are subsequently suspended in solution, their heat lability is largely increased in the viscinity of their isoelectric points, and they readily precipitate from solution.

Reduction of the calcium concentration of whey material is, therefore, an important step in one of the processes of this invention and preferably this reduction should take place prior to any concentration or drying of the liquid whey material. This will minimize the formation of protein aggregates and will readily permit the production of protein material which is soluble and heat stable at pH 4.0 and below.

Usually the calcium concentration will be reduced by removing calcium from the liquid whey material. However, it is also contemplated by this invention that the calcium concentration can be reduced by blending a high calcium whey such as cheddar and cottage cheese whey with a low calcium whey material such as swiss cheese whey.

If the calcium content is not reduced prior to any concentration or drying operations, protein aggregates may be formed, and the presence of these aggregates in the resulting protein material will limit the effectiveness of the final product in that it may not be possible to form clear protein solutions at about pH 4.0 and also the protein material will be more susceptible to precipitation from solutions at about pH 4.0 under the influence of heat.

It has been found that the calcium concentration of the liquid whey should be reduced to a point which effectively prevents the formation of significant amounts of large protein aggregates. According to this invention, the calcium concentration of the liquid whey should be adjusted to a calcium to protein ratio of from 0.03 to 0.09. When commerical wheys such as cheddar and cottage cheese wheys are employed in this invention it will usually be necessary to reduce the calcium concentration by about 10 to 50 percent in order to bring the calcium to protein ratio within the desired range.

Among the methods that have proven to be successful for the removal of calcium from the liquid whey, chemical separation techniques such as are the precipitation of calcium through the formation of insoluble calcium salts, physical separation techniques such as the separation of calcium salts by such means as ultrafiltration, reverse osmosis and the like and the removal of calcium by ion exchange techniques.

According to the calcium salt precipitation procedure the pH of the liquid whey is raised to the range of about 7.0 to 7.2 by means of a suitable alkali, preferably the alkali metal hydroxides such as sodium and potassium hydroxide. The neutralized whey is then heat treated at about 65°C and preferably in the range of 65°C to 72°C.

The temperature to which the neutralized whey may be raised will depend upon the length of time the whey is kept at the elevated temperature. Thus at a temperature of 65°C a time of several minutes is necessary, whereas at 72°C only a momentary interval is required.

At these elevated temperatures it is preferred that the calcium to protein ratio be reduced to the range between 0.03 and 0.07.

The hot whey is then centrifuged, usually at about 4000 to 7000 G, and the supernatant liquid is brought to room temperature and is adjusted, by the addition of an edible acid material, to a pH level either above or below the isoelectric point of the whey proteins. The isoelectric point of these whey proteins normally falls within the range of about pH 4.5 to 5.2.

This procedure accomplishes several desirable functions; it pasteurizes the whey, removes from the supernatant liquid sufficient calcium, mostly as insoluble calcium phosphate, to reduce the calcium to protein ratio between about 0.03 and 0.07, coagulates and removes the highly heat sensitive globulin fraction of the whey protein, removes from the supernatant insoluble elements such as fat and sediment, and partly reacts the beta-lactoglobulin fraction of the whey with the alpha-lactalbumin fraction to form a complex which is more heat stable and less sensitive to the calcium content than is the beta-lactoglobulin itself.

According to a physical separation procedure calcium is removed from the whey by such means as ultrafiltration of the whey at pH levels of about 6.5 or 3.0, these levels being respectively above and below the isoelectric point of the whey proteins. The resultant whey material is then pasteurized and clarified in order to accomplish the same functions set forth above.

Ultrafiltration is a type of molecular sieve arrangement in which by means of a membrane having a particular pore size molecules smaller than the selected pore size can be separated from molecules larger than this pore size. In a typical system the material to be processed is pumped into a high pressure permeation chamber from which a solution of the smaller molecules is forced to pass through the membrane, resulting in an increased concentration of the larger molecules remaining in the permeation chamber. The fluid in the chamber is usually continuously circulated to help minimize the concentration gradient near the surface of the membrane.

After the whey has been treated to adjust the calcium concentration, the resulting liquid material is further processed in order to isolate a high protein material preferably containing 50 percent or more protein on a dry weight basis. The procedures which have been found acceptable to process the treated whey material comprises both a concentration step and a physical separation step.

The concentration step is desirable in order to increase the efficiency and economy of the subsequent separation operation. The conditions employed during concentration should be those which do not denature or degrade the protein.

The physical separation is preferably performed by molecular separation techniques, such as gel filtration, ultra-filtration, reverse osmosis, dialysis and the like, in which molecules may be separated according to their molecular size.

Among the specific alternative procedures contemplated by this invention are (1) concentration of the treated whey to about one-third volume followed by gel filtration of the concentrate through a dextran gel molecular sieve such as Sephadex G-25, (2) concentration of the treated whey to about one-third volume, spray drying the concentrate and subsequently, possible after storage and/or shipping of the dry product, reconstituting the spray-dried product to about 25 to 30 percent solids and filtering it over Sephadex G-25, (3) spray-drying the treated whey and subsequently reconstituting the spray-dried product to about 25 to 30 percent solids and filtering it over Sephadex G-25, (4) concentration of the treated whey, removing part of the lactose by forced crystallization, and then filtering the remaining solution over Sephadex G-25, (5) concentration of the treated whey and then filtering the concentrate by means of ultrafiltration, or (6) concentration of the treated whey, removing part of the lactose by forced crystallization and then ultrafiltering the remaining solution.

All of the above treatments can be performed with treated whey samples having pH levels of either about 6.5 or about 3.0, which levels are respectively above and below the isoelectric points of whey proteins. It was found, however, that use of pH level about 3.0 appeared to increase the heat stability of and reduce microbial contamination in the resulting protein materials.

Gel filtration is a known molecular separation technique for the recovery of protein from whey. The procedure generally calls for passing the liquid whey through a bed containing a molecular sieve material which selectively entraps molecules smaller than the protein and permits the whey protein molecules to pass through the bed in an eluant.

A molecular sieve having an exclusion limit of from 5,000 to 10,000 molecular weight is particularly preferred for separating whey proteins from the lactose and salt components. One of the most satisfactory molecular sieve materials is a stable modified dextran gel composed of cross-linked linear macromolecules in a three dimensional network of polysaccharide chains. Such modified dextran molecular sieves and their preparation are described in U.S. Pat. Nos. 3,042,667 and 3,208,994 and are available commercially under the name Sephadex.

The protein containing liquid which is obtained after a molecular separation operation is preferably concentrated under conditions which will not degrade the protein, such as by evaporation, and then dried in a manner that will not degrade the protein such as spray drying or freeze drying.

The protein material obtained according to the process of this invention has been found to possess a high degree of stability in solution up to about 7 percent protein at pH 4.0 and below, even when exposed to heat treatments ranging from pasteurization to sterilization. This protein material is ideally suited for addition to acid beverages, either carbonated or non carbonated as well as to powdered acid beverage mixes, in order to produce protein beverages.

It has been found that the protein materials produced in accordance with this invention should contain on a weight basis the following ratios of materials:

| calcium to protein | .002 to 0.05 |
| ash to protein | .02 to 0.2 |
| calcium to ash | .02 to 0.35 |

Whey protein material which is heat stable at pH 4.0 and below has been obtained from whey by methods which do not include a calcium reduction step. However, these protein materials appear to be produced only on a hit or miss basis depending upon the initial composition of the liquid whey and the type of molecular separation and technique employed to separate the protein material from the whey.

Thus, if an untreated liquid whey is spray dried immediately after collection and subsequently reconstituted to about a 25 to 30 percent solids containing solution and then, preferably after a portion of the lactose has been crystallized out, filtered by means of a molecular sieve material such as Sephadex G-25, the whey proteins obtained will be heat stable at pH 4.0 and below if the following ratios can be obtained:

| calcium to protein | .015 to .04 |
| ash to protein | 0.11 to 0.17 |
| calcium to ash | 0.12 to 0.29 |

As can be seen calcium removal from liquid whey immediately after collection and before drying or concentraton permits the production of whey protein material which is heat stable at about pH 4.0 and below which has a wider range in the identified weight ratio parameters than whey protein material obtained when calcium is not initially removed.

Attempts to adjust the ionic environment and calcium content of whey protein material to within the parameters set forth in this invention after the protein material has been isolated have not been successful in producing a heat and acid stable protein material. This is thought to be due to the irreversibility of the mechanism that produces the protein aggregates and the resultant heat lability of these aggregates.

This invention is further described but not limited by the following examples:

EXAMPLE 1

A liquid cheddar whey (6% solids and pH 5.2) comprising on a solids basis 11.1% protein, 68.1% lactose, 13.4% ash, and including on a weight solids basis 1.07% calcium and 1.09% phosphorus is brought to pH 7.0 with a concentrated sodium hydroxide solution. The neutral whey material is heated to 65°C for 15 minutes, centrifuged at this temperature at 5000 G and then cooled to room temperature. The supernatant liquid is recovered and this liquid is brought to a pH of 6.5 by the addition of phosphoric acid. The liquid is freeze-dried yielding a solid material having a composition including, on a dry basis, 12.1% protein, 66.0% lactose and 12.3% ash and also containing 0.73% calcium and 0.96% phosphorus. The freeze dried material is reconstituted to a total solids content of 25 percent and 120 ml were placed on a Sephadex column (5.0 cm in diameter, 86 cm in length) containing Sephadex G-25 and eluted with water. The initial 1340 ml of effluent was collected and freeze-dried to yield a material containing on a dry basis 67.3% protein, 13.2% lactose and 6.3% ash and also containing 0.77% calcium and 1.76% phosphorus.

EXAMPLE 2

The liquid whey of example 1 adusted to pH 6.5 with phosphoric acid is ultrafiltered for a period of 3 hours in a 2 sq. ft. Dorr-Oliver ultrafiltration unit equipped with a type-APA Dorr-Oliver membrane and operating with a pressure of 50 psig. The resulting concentrate is then heated and centrifuged as in example 1 and the supernatant liquid is freeze-dried to yield a composition containing on a dry basis 20.2% protein, 60.1% lactose and 11.4% ash and also containing 1.68% calcium and 0.80% phosphorus. This material is then reconstituted to a 30 percent total solids content and 100 ml were placed on a Sephadex column and eluted with water as in example 1. The initial 1120 ml of effluent was collected and freeze-dried to yield a material containing on a dry basis 81.0% protein, 8.0% lactose and 7.4% ash and also 0.72% calcium and 0.73% phosphorus.

EXAMPLE 3

Using the freeze-dried protein material (67.3% protein) of example 1 a grape-flavored beverage of pH 4.0 and about 3% protein is formulated according to the following composition:

| | |
|---|---|
| protein material | 4.5 grams |
| Sucrose | 15.0 grams |
| phosphoric acid (conc) | 1.0 ml |
| sodium benzoate | 0.1 grams |
| grape color & flavor | as desired |
| water | 80.0 grams |

This beverage formulation forms a clear solution which is able to be heat treated even at sterilization conditions, for example 240°F for 15 minutes, without the precipitation of any protein material. If desired this beverage may be carbonated according to procedures known to those skilled in the art.

EXAMPLE 4

Using the freeze-dried protein material (81.0% protein) of example 2 an orange flavored beverage of pH 3.8 and protein content of about 3 percent is formulated according to the following composition:

| | |
|---|---|
| protein material | 3.5 grams |
| sucrose | 15.0 grams |
| phosphoric acid (conc.) | 1.3 ml |
| sodium benzoate | 0.1 grams |
| orange color & flavor | as desired |
| water | 81.0 grams |

This formulation is capable of being heat treated and/or carbonated as described in example 3.

Obviously the protein material produced in accordance with this invention may be effectively added to any number of acidic beverages, such as fruit juices, vegetable juices, carbonated and non-carbonated soft drinks, and the like, to produce a nutritious, protein beverage. It is also possible to incorporate the protein material in powdered beverage mixes.

EXAMPLE 5

Using the freeze-dried protein material of example 2 a powdered orange beverage mix having following composition:

| | |
|---|---|
| sugar | 65.6 grams |
| protein material | 24.6 grams |
| citric acid | 4.2 grams |
| sodium citrate | 0.5 grams |
| cloud agent | 1.7 grams |
| tricalcium phosphate | 0.5 grams |
| orange flavor and color | as desired |

Thirty-three grams of this powdered mix added to 8 ounces of water produces an orange flavor beverage having a protein level of about 4 percent and a pH of 3.7.

It will be apparent that there are variations and modifications of this invention and that the examples, preferred proportions and ingredients, and typical operating conditions may be varied without departing from the scope of the invention.

Having thus described the invention what is claimed is:

1. A method for producing a heat and acid stable whey protein material comprising the steps of:
   a. obtaining a liquid whey material which has not previously been subjected to concentration or drying operations,
   b. reducing the calcium to protein ratio of the liquid whey material to between about 0.03 and 0.09, and thereafter
   c. subjecting the treated liquid whey to a molecular separation operation at a pH level either about 6.5 or about 3.0 in order to isolate a whey protein material containing at least 50% protein on a dry weight basis and containing on a weight ratio basis calcium to protein of from .002 to .05, ash to protein of from .02 to 0.2 and calcium to ash of from .02 to 0.35.

2. The method according to claim 1 wherein the calcium to protein ratio is reduced by ultrafiltration.

3. The method according to claim 1 wherein the treated whey liquid is concentrated prior to physical separation.

4. The method according to claim 1 wherein the calcium to protein ratio is reduced by 10% to 50%.

5. The method according to claim 1 wherein the treated whey liquid is heated and clarified prior to molecular separation.

6. The method according to claim 1 wherein the calcium to protein ratio is reduced to between about 0.03 and 0.07.

7. The method according to claim 6 wherein the calcium to protein ratio is reduced by precipitating calcium salts.

8. The method according to claim 7 wherein the calcium salts are precipitated by raising the pH of the liquid whey to about 7.0 to 7.2 and then heating the neutralized whey to the range of 65°C to 72°C.

* * * * *

UNITED STATES PATENT OFFICE
CERTIFICATE OF CORRECTION

Patent No. 3,791,283         Dated February 12, 1974

Inventor(s)  Victor Moreno et al.

It is certified that error appears in the above-identified patent and that said Letters Patent are hereby corrected as shown below:

In column 8, line 39 (Claim 3, line 2), change "physical" to -- molecular --.

Signed and sealed this 29th day of October 1974.

(SEAL)
Attest:

McCOY M. GIBSON JR.
Attesting Officer

C. MARSHALL DANN
Commissioner of Patents